United States Patent [19]

Madl et al.

[11] 4,075,358

[45] Feb. 21, 1978

[54] PROCESS FOR REDUCING COMBUSTION PRODUCT RESIDUES IN PRODUCTS DRIED BY A DIRECT FLAME UNIT

[75] Inventors: Ronald L. Madl, Webster Groves; Frank J. Simon, St. Charles; Jerry T. Ortinau, St. Louis, all of Mo.

[73] Assignee: Ralston Purina Company, St. Louis, Mo.

[21] Appl. No.: 755,414

[22] Filed: Dec. 29, 1976

[51] Int. Cl.$^2$ ............................. A23B 7/00; A23B 4/04
[52] U.S. Cl. ......................................... 426/465; 34/26; 426/471; 432/19; 432/29
[58] Field of Search ............... 426/453, 443, 465, 471, 426/520; 34/26; 239/397.5; 99/483; 432/29, 26, 23, 19, 222

[56] References Cited

U.S. PATENT DOCUMENTS

| | | | |
|---|---|---|---|
| Re. 25,626 | 7/1964 | Yeo et al. | 432/222 |
| 2,900,256 | 8/1959 | Scott | 426/453 |
| 3,121,639 | 2/1964 | Bauer et al. | 426/471 X |
| 3,143,428 | 8/1964 | Reimers et al. | 426/453 X |
| 3,240,478 | 3/1966 | Marks | 432/29 |
| 3,247,890 | 4/1966 | Williams | 426/465 X |
| 3,297,259 | 1/1967 | Maxon et al. | 239/397.5 |
| 3,541,190 | 11/1970 | Flynn | 432/29 |
| 4,011,041 | 3/1977 | Taylor | 432/222 X |

*Primary Examiner*—S. Leon Bashore
*Assistant Examiner*—Kenneth M. Schor
*Attorney, Agent, or Firm*—Virgil B. Hill

[57] ABSTRACT

A process for the air drying of a food material, such as a proteinaceous material, is disclosed wherein the drying air is heated by direct contact with a burner in such a manner that the formation of undesirable residues in the proteinaceous material as a result of combustion products from the burner is substantially reduced. The burner is operated by feeding to it a fuel mixture containing a stoichiometric quantity of air for purposes of combustion to avoid the use of drying air for combustion. The burner is also operated to provide a heat output which is sufficient for drying of the proteinaceous material but which does not exceed 800,000 BTU/hr.-/lineal ft. of burner. The burner is also shielded from the drying air while operated at the necessary firing rate or heat output to substantially avoid aeration of the flame by the drying air. Control of the velocity of the drying air together with the above factors substantially reduces the presence of burner combustion products in the drying air, and therefore, residues of burner combustion products in the materials to be dried.

9 Claims, No Drawings

PROCESS FOR REDUCING COMBUSTION PRODUCT RESIDUES IN PRODUCTS DRIED BY A DIRECT FLAME UNIT

BACKGROUND OF INVENTION

The instant invention relates to a process for the drying of a food material especially a proteinaceous material, and specifically to a process for air drying wherein the drying air is heated by direct contact with a burner which is operated in such a manner that the formation of undesirable burner combustion product residues in the proteinaceous material, especially nitrite residues, is substantially reduced.

Dried food materials such as proteinaceous materials are widely used as ingredients in foodstuffs, either for protein supplementation or as an alternative for a proteinaceous ingredient such as fresh milk, or eggs. Materials of this type include milk derived protein such as dried casein, casein and whey mixtures, or egg derived protein such as albumin. Also employed are vegetable protein materials, including isolates or concentrates derived from various vegetable protein materials such as soybeans, cottonseed, peanuts, and the like. Dried isolates obtained from the isolation of the proteinaceous material in vegetable protein sources such as soybeans, are widely used as a food ingredient. These isolates are usually produced by the extraction and solubilization of the proteinaceous component in the vegetable protein material, followed by centrifugation or clarification to remove residual, unextracted materials.

The solubilized proteinaceous material, which is typically extracted from the proteinaceous source in a neutral or alkaline aqueous medium is then acidified and the pH of the extract adjusted to the isoelectric point of the protein. The proteinaceous material precipitates at the isoelectric point and is then concentrated by centrifugation or similar means. The concentrated protein material can then be neutralized if desired, retained at or near the isoelectric point, or further processed to improve the functional properties of the proteinaceous material. Typical processes which illustrate further treatment of the proteinaceous material for deflavoring, or an increase in the functional properties of the protein material are those described in U.S. Pat. Nos. 3,642,490; 3,645,745; 3,830,942; and 3,694,221.

Regardless of the type of further processing involved with a protein isolate, dewatering of the material is conventionally carried out to provide a dried material since the dried material presents no storage problems, and is more convenient to use as a food ingredient. Dewatering of the proteinaceous material can be varied out by a variety of means which are conventional in the art. The most desirable means of dewatering is to employ a stream of heated air which comes in contact with the proteinaceous slurry in order to remove free water as quickly and efficiently as possible without adversely affecting the functional properties of the proteinaceous material.

The most widely used process of this general type is referred to as spray drying. Spray drying generally consists of atomizing the proteinaceous material or slurry into a drying chamber by forcing the product through a nozzle at a high pressure in order to break up the liquid. As the atomized product is introduced into the drying chamber, heated air is also forced through the chamber. The air furnishes heat for evaporation of the moisture and the air becomes the carrier for removal of the moisture from the dryer. The air for drying is typicaly filtered and heated before it passes through the atomized product and can be forced through the chamber by a pressure or suction system.

The air for drying may be heated in a variety of ways including the use of an indirect heater or a direct fired, indirect heater, either of which are operated by burning of the fuel and transferring the heat through a metal surface to the air. A direct fired unit may also be used in which combustion products from the flame or burner enter the dryer since the flame is in direct contact with the air used for drying. The direct fired units have the advantage of being more efficient due to less heat loss during heat transfer and the resultant higher temperature of the inlet air into the chamber for drying. The dried product is separated from the air stream after drying, cooled and packaged.

While a direct fired unit provides a very efficient means of heating the inlet air for a spray drying system, nevertheless, a disadvantage of systems of this type is that combustion products from the flame enter the heated air stream. Typical combustion products from the flame include gases such as nitrogen or carbon oxides. The nitrogen oxides are a particular problem in the drying of food ingredients such as proteinaceous materials since nitrous oxide or nitrogen dioxide produced by combustion are introduced into the air used for drying and because of the presence of water in the product to be dried are converted to nitrous acid ($HNO_2$) in the product. If the proteinaceous material is still somewhat acidic, the nitrous acid formed in the product is somewhat stable and doesn't readily dissociate or ionize to form nitrite which can be retained in the product. The relative stability of the $HNO_2$ in the acidic environment makes removal of this material with the water somewhat easier and there is less tendency to form residual levels of nitrite in the product if it is dried at an acidic pH, usually below 6.0. If, however, the environment is not acidic, the $HNO_2$ tends to ionize or disassociate to result in the formation of nitrite ($NO_2^-$) which is not readily removed with the water during drying because of its ionic form. This results in the creation of an undesirable residue of nitrite in the dried proteinaceous material. Therefore, a means is needed to achieve satisfactory dewatering or drying of a proteinaceous ingredient, whether at an acidic pH or not, including vegetable protein isolates, with direct flame heating of the air stream used for drying, to reduce the formation of residues of nitrite in the dried proteinaceous ingredient.

It is, therefore, an object of the present invention to provide an improved process for the drying of a proteinaceous material using direct flame heating of the air stream used for moisture removal. It is a specific objective of the present invention to provide a process for the drying of proteinaceous materials with direct flame heating of the air stream for drying wherein the formation of nitrite or other combustion product residues in the dried proteinaceous material is substantially reduced.

SUMMARY OF THE INVENTION

The present invention provides a process for the drying of a food material, especially a proteinaceous material employing dried contact of the flame or burner with the air used for drying, wherein nitrite or other residual flame combustion product contamination of the dried material is reduced. The present invention provides a process of this type wherein the drying air is heated by direct contact with a burner or flame which is operated by a combustible gas or fuel mixture comprising; forming a combustible gas or fuel mixture by mixing a combustible gas with a stoichiometric quantity of air to provide substantially complete combustion of said gas or fuel; feeding said mixture to a flame or burner used for heating of the drying air at a high enough firing rate to give a flame or burner output sufficient to dry the material or between about 300,000 and 800,000 BTU per lineal foot of burner per hour. The air stream used for drying is operated at a velocity of at least about 2,000 ft./min., preferably between about 2,000 and 5,000 ft./minute; and the flame shielded from said drying air in such a manner to substantially avoid aeration of said flame from the drying air for purposes of combustion.

The combination of steps for the operation of the flame or burner used for heating of the drying air minimizes or reduces combustion products in the air stream. This in turn reduces formation of undesirable residues of burner combustion products such at nitrites, in the dried proteinaceous materials.

The operation of the flame in the above manner to heat the air stream for drying is particularly useful for the spray drying of food materials, which is the most widely used form of drying although it is equally applicable to other drying techniques for heating of the air stream used for moisture removal. The present invention is, therefore, generally described in terms of the spray drying of proteinaceous materials, and the present invention may be used to heat the drying air in various types of spray drying equipment including horizontal and vertical chamber spray dryers all of which rely upon the concurrent flow of an air stream and product to remove moisture from the proteinaceous material.

DESCRIPTION OF THE PREFERRED EMBODIMENTS

The above combination of steps involve critical control of the flame or burner used for direct heating of the drying air in order to minimize the presence of combustion products from the flame in the drying air. This critical combination of steps is initially dependent upon the formation of a fuel of gas mixture used for combustion, wherein a stoichiometric quantity of air needed for substantially complete combustion of the mixture is mixed with the fuel or gas prior to combustion. Another critical factor is operation of the flame or burner at such a firing rate and, therefore, heat output that a sufficient quantity of heat is generated for drying, yet is below an output level at which the presence of combustion products from the flame are substantially increased in the drying air. Another critical factor includes control of the flame or burner to minimize aeration of the flame from the drying air during combustion. All of these factors have been determined to be significant in the satisfactory drying of a proteinaceous material without the formation of undesirable residues in the material because of direct contact of the flame or burner with the drying air.

While it is not intended to limit the present invention by the type of equipment that may be used to practice the same, nevertheless, burner equipment which is highly satisfactory in achieving control of the flame and combustion products, is generally described in U.S. Pat. Nos. 3,297,259 and U.S. Pat. No. Re. 25,626 herein incorporated by reference, and this equipment is commercially available from Maxon Corporation, Muncie, Ind. The present objective of minimizing undesirable combustion products in the air stream used for drying is also best achieved with a total premix burner or one in which a stoichiometric quantity of air can be premixed with the fuel of gas prior to combustion since it has been determined to be essential to control of nitrogen oxides in the air stream and therefore, nitrite in the final product to substantially avoid the use of the drying air for purposes of combustion even though use of the drying air for combustion is generally considered in the air to be desirable for efficient fuel use and burner performance. In this regard, it is necesssary to premix a stoichiometric quantity of air needed for substantially complete combustion of the fuel or gas prior to combustion since the use of the drying air for purposes of combustion is to be avoided as much as possible and this also involves flame or burner control which will be discussed in more detail below. Typically, the amount of air premixed in this manner will be at least 80% of the air needed for combustion purposes. This level of air in the fuel mixture minimizes the need for aeration of the flame from the drying air which is used for removal of moisture from the proteinaceous material.

It has also been determined to be essential to the present invention to mantain proper control over the flame geometry or burner pattern in order to eliminate the necessity of using the drying air for purposes of combustion. As previously noted, it is considered desirable by the prior art to use the drying air for combustion purposes. Although it is recognized by the prior art that a low stage of operation for the burner is possible wherein a low firing rate is used and combustion occurs independent of any means used to withdraw combustion air from the drying air, nevertheless, such a low stage of operation for the burner did not appreciate using a high firing rate at this stage of operation and therefore, control of the heat output from the flame at this low stage of operation within a critically defined range to minimize combustion products in the drying air. A minimum heat output is, of course, necessary in order to meet practical needs for the drying of proteinaceous materials and control of heat output is also necessary to substantially reduce the formation of undesirable combustion products from the burner in the drying air. Flame output or heat generated by the burner is defined in the present invention in terms of BTU/hr./lineal ft. of the burner and will be discussed in more detail below. Control of the heat output from the burner should, however, be recognized as a significant factor in achieving the specific objective of controlling undesirable combustion product residues in food materials to be dried by the use of a direct flame unit.

Control of the flame in the present invention to substantially avoid the use of the drying air for purposes of combustion is satisfactorily achieved in the present invention by the use of burners generally described in U.S. Pat. No. 3,297,259 and U.S. Pat. No. Re. 25,626 which are equipped with "mixing plates" or baffles. These plates usually function in conventional burner operation as a means of reaching into the surrounding flow of drying air for the purposes of progressively scooping small jets of air into a fuel mixture that is rich in gas. These openings are graduated to provide increasing increments of combustion air as the volume of richness of the fuel mixture is increased. Therefore, typical and recommended operation of a burner of the above type in the prior art would be to utilize the advantage of this burner to extract air for combustion purposes from the drying air and to completely fill the trough or channel created by the mixing plates with the flame. As previously noted, however, the use of the drying air for combustion increases the presence of combustion products in the drying air and therefore, the products to be dried. It is, therefore, considered to be necessary to provide a complete premix of fuel and combustion air prior to combustion, as well as to exercise flame control and prevent excessive mixing of the drying air with the flame.

Burners of the type noted above, satisfactorily avoid the need to extract combustion air from the drying air if the flame is operated in such a manner that the mixing plates or baffles act as a shield for the flame and prevent the extraction of air from the drying air for combustion purposes. By the same token, and even though the channel or trough in which combustion occurs is protected from the drying air because of the divergent mixing plates, nevertheless, the openings or air jets normally used for extraction of combustion air from the air stream also avoid the creation of a vacuum in the channel when the dryer is operated at a relatively high air stream velocity. Formation of a vacuum would also result in extraction of air in from the drying air by the withdrawal of air around the plates and into the flame during combustion. Therefore, proper flame control is achieved by shielding of the flame, which when combined with a premix of the fuel and air needed for combustion results in a means of heating the drying air wherein combustion products such as nitrogen oxides in the drying air is substantially reduced.

It is also critical, relative to the present invention that at the above stage of operation, where the flame is shielded, that the firing rate and therefore, the output of the burner be such that a practical temperature is achieved for moisture removal and drying although it has been determined that the burner should not be operated at an output above 800,000 BTU/hr. lineal ft. of burner since the level of nitrogen oxides in the drying air increases to unacceptable levels. Therefore, when it is necessary to have a certain heat output from the burner or flame to achieve an air temperature generally of between 330° and 600° F. depending on the volume and speed of the drying air, nevertheless, a minimum and typical output to provide satisfactory drying while minimizing combustion product formation pursuant to the present invention will be on the order of about 300,000 BTU/hr./lineal ft. of burner and preferably 600,000 BTU/hr./lineal ft. of burner. The exact minimum output which may be employed, should not be judged as critical relative only to the attainment of low levels of nitrogen oxides in the air stream since it is apparent that operation of the flame at a very low stage of operation, wherein a low firing rate or less than the minimum heat output is maintained for drying purposes, may result in low levels of nitrogen oxides in the air stream even though the output of the burner is generally less than that which is considered reasonable and practical for the drying of proteinaceous materials. The present invention is, therefore, limited in the sense of providing a sufficient output by the burner or flame to achieve satisfactory drying of the food material although in no case should the output of the burner exceed 800,000 BTU/hr./lineal ft. of burner. Control of the heat output below this level avoids the formation of unacceptable levels of nitrogen oxides in the air stream used for drying.

Control of the surrounding air stream or drying air is also important although less critical than the other factors and the velocity of the air stream used for drying purposes should be generally maintained at a velocity of at least about 2,000 ft./min. and preferably between about 2,000 and 5,000 ft./min. as measured at th outer edge of the mixing plates or shields of the burner since at this velocity, a proper balance is achieved between flame control, output and air velocity to result in an optimization of drying conditions which will effectively provide efficient drying of materials with a direct flame unit for heating of the air stream while substantially reducing the formation of undesirable combustion products such as nitrogen oxides in the drying air.

The following examples will generally serve to be illustrative rather than to limit our invention, since it should be understood that other examples of equipment, materials, etc. could be given to illustrate the unique characteristics of the present process for drying, food materials.

The following examples illustrate the general levels of nitrogen oxides obtained in various drying air streams operated with a direct flame unit. The level of nitrogen dioxide in the air stream in each of the examples was determined according to the following procedure, which is generally described in *Methods of Air Sampling and Analysis*, American Public Health Assn. (1972) p. 340.

A color reagent is first prepared by taking 860 ml of distilled water and adding thereto 140 of glacial acetic acid. 5.5 g of sulfanilic acid is dissolved in this mixture followed by the addition of 0.02 g of N-(1 - Naphthyl) ethylene diamine dihydrochoride. This reagent is kept in a sealed container.

A 10 ml aliquot of the color reagent is placed in a 2 liter flask of calibrated volume. A partial vacuum is generated in the flask and the pressure measured by a manometer. The gas sample is collected when the vacuum is released. After equilibrium is achieved between air sample and color reagent in the flask or after about 30 minutes the pressure is again measured and the absorbance is read at 550 millimicrous on a colorimeter.

The level of nitrogen dioxide in the air stream is calculated by the following equation:

$$V_s = (V_f - V_r) \times \frac{\Delta P \text{ in Hg}}{30} \times \frac{298.2}{t + 273.2}$$

$V_s$ = Volume of sample gas at 25° C.
$V_f$ = Calibrated volume of flask. (2,050ml)
$V_r$ = Volume of color reagent, (10ml)
$\Delta P$ = Pressure reading (inches of Mercury) Partial Vacuum — Pressure at equilibrium (inches of Mercury)
$t$ = Temperature of flask at equilibrium (C°) assuming $t$ is 25° C. equation then simplifies to:
$V_s = 67.91 \, (\Delta P)$ $$\frac{NO_2}{\text{p.p.m.}} = \frac{24.47 \times W \times 10^6}{46 \times V_s}$$

24.47 = Molar volume at 25° C.
$W$ = mg/l of $NO_2$ in reagent solution.
46 = Molecular weight of $NO_2$.
Since 0.3 p.p.m. $NO_2$ = 0.34 Absorbance units, equation simplifies to:

$$\underset{\text{p.p.m.}}{NO_2} = \frac{69.1 \times \text{Absorbance}}{\Delta P} \text{ (550 millimicrons)}$$

The levels of nitrogen dioxide in the drying air of Example 1 – 10 are expressed for purposes of comparison according to the following unit of measurement which takes into account the size of the burner and firing rate employed.

$$NO_2 \text{ output} = \frac{\text{Measured } NO_2 \text{ (p.p.m.)} \times 10^4}{\text{firing rate (cubic } \frac{\text{ft.}}{\text{hr.}}) \times \text{lineal ft. of burner.}}$$

EXAMPLE 1

A standard 3 ft. section of a Series "66" Airflo ® Line Burner, Type "AL-5" available from Maxon Corporation, Muncie Ind. and generally described in U.S. Pat. No. 3,297,259 and U.S. Pat. No. Re. 25,626 was operated at a firing rate of 1,450 cubic ft./hr. and a manifold pressure of 17.7 inches of water to provide a heat output of 483,000 BTU/hr./lineal ft. of burner. The velocity of the drying air was 2,600 ft./min. and a drying air temperature of 430° F. was achieved. 97% of the air needed for purposes of combustion was premixed with the gas before being fed to the burner. The flame produced in the burner was narrow and was shielded from the drying air by the mixing plates or baffles of the Type "AL-5" burner. The nitrogen dioxide output in the drying air was measured at 0.84.

EXAMPLE 2

The burner identified in Example 1 was operated in a conventional manner by using a portion of the drying air for purposes of combustion of the fuel mixture. In this regard, a firing rate of 2,000 cubic ft./hr. and a manifold pressure of 4.3 inches of water was employed to provide a heat output of 667,000 BTU/hr./lineal ft. of burner. 23% of the air needed for purposes of combustion was premixed with the gas prior to being fed to the burner. The velocity of the drying air was 3,600 ft./min. which resulted in a drying air temperature of 480° F. The flame produced in the burner completely filled the mixing plates or baffles of the burner and therefore, extracted a portion of the drying air for combustion purposes. The nitrogen dioxide output in the drying air was measured at 1.95. It may be seen that use of the drying air for purposes of combustion causes a significant increase in flame combustion products in the drying air.

EXAMPLE 3

A 3 ft. section of a Series "66" Airflo ® Line Burner Type "AL-5" available from Maxon Corporation, Muncie, Ind. was modified to the extent that the holes in the burner were increased to a No. 25 drilled hole with a diameter of 0.150 inches as compared to a standard No. 36 hole with a diameter of 0.106 inches in Example 1. This burner was operated at a firing rate of 2,175 cubic ft./hr. and a manifold pressure of 10.2 inches of water to provide a heat output of 725,000 BTU/hr. lineal ft. of burner. 133% of the air needed for purposes of combustion was premixed with the gas before being fed to the burner. The velocity of the drying air was 2,000 ft./min. and 485° F. temperature in the drying air was achieved. The flame was narrow and was shielded from the drying air by the mixing plates on the burner. The nitrogen dioxide output in the drying air was measured at 0.72.

EXAMPLE 4

The burner modified as in Example 3 was operated at a firing rate of 2,175 cubic ft./hr. and a manifold pressure of 10.2 inches of water to provide a heat output of 725,000 BTU/hr./lineal ft. of burner. 133% of the air needed for purposes of combustion was premixed with the gas prior to being fed to the burner. The velocity of the drying air was 4,100 ft./min. which resulted in a drying air temperature of 475° F. The flame was narrow and was shielded from the drying air by the mixing plates or baffles on the burner. The nitrogen dioxide output in the drying air was measured at 1.01.

EXAMPLE 5

The burner modified as in Example 3 was operated at a firing rate of 2,300 cubic ft./hr. and a manifold pressure of 10.2 inches of water to provide a heat output of 767,000 BTU/hr./lineal ft. of burner. 124% of the air needed for purposes of combustion was premixed with the gas prior to being fed to the burner. The velocity of the drying air was 4,900 ft./min. which resulted in a drying air temperature of 475° F. The flame was narrow and was shielded from the drying air by the mixing plates of the burner. The nitrogen dioxide output in the drying air was measured at 0.77.

EXAMPLE 6

A 2 ft. section of burner modified as in Example 3 was operated at a firing rate of 1,925 cubic ft./hr. and a manifold pressure of 14 inches of water to provide a heat output of 962,000 BTU/hr./lineal ft. of burner. 116% of the air needed for purposes of combustion was premixed with the gas prior to being fed to the burner. The velocity of the drying air was 4,700 ft./min. which resulted in a drying air temperature of 480° F. The flame produced in the burner completely filled the mixing plates or baffles of the burner and therefore, extracted a significant portion of the drying air for combustion purposes. The nitrogen dioxide output in the drying air was measured at 1.77.

EXAMPLE 7

A 2 ft. section of the burner was modified as in Example 3 was operated at a firing rate of 1,525 cubic ft./hr. and a manifold pressure at 11 inches of water to provide a heat output of 762,000 BTU/hr./lineal ft. of burner. 130% of the air needed for purposes of combustion was premixed with the gas prior to being fed to the burner. The velocity of the drying air was 3,000 ft./min. which resulted in a drying air temperature of 460° F. The flame produced in the burner completely filled the mixing plates or baffles of the burner and, therefore, extracted a significant portion of the drying air for combustion purposes. The nitrogen dioxide output in the drying air was measured at 2.95.

EXAMPLE 8

A 2 ft. section of the burner modified as in Example 3 was operated at a firing rate of 1,625 cubic ft./hr. and a manifold pressure of 8 inches of water to provide a heat output of 812,000 BTU/hr./lineal ft. of burner. 102% of the air needed for purposes of combustion was premixed with the gas prior to being fed to the burner. The velocity of the drying air was 4,300 ft./min. which resulted in a drying air temperature of 480° F. The flame produced in the burner completely filled the mixing plates or baffles of the burner and, therefore, extracted a significant portion of the drying air for combustion purposes. The nitrogen dioxide output in the drying air was measured at 2.46.

EXAMPLE 9

A 2 ft. section of the burner modified as in Example 3 was operated at a firing rate of 1,050 cubic ft./hr. and a manifold pressure of 2.3 inches of water to provide a heat output of 525.000 BTU/hr./lineal ft. of burner. 87% of the air needed for purposes of combustion was premixed with the gas prior to being fed to the burner. The velocity of the drying air was 3,100 ft./min. which resulted in a drying air temperature of 382° F. The flame produced in the burner completely filled the mixing plates or baffles of the burner and, therefore, extracted a significant portion of the drying air for combustion purposes. The nitrogen dioxide output in the drying air was measured at 3.24.

EXAMPLE 10

A Series "66" Airflo ® Line Burner, Type "AL-5" available from Maxon Corporation, Muncie, Ind., in the shape of a cross with one segment of the cross having a length of 2 ft. and the second segment of the cross having a length of 1 ft. The holes in the burner consisted of No. 30 drilled holes with a diameter of 0.129 inches. This burner was operated at a firing rate of 1,800 cubic ft./hr. and a manifold pressure of 16.9 inches of water to provide a heat output of 600,000 BTU/hr./lineal ft. of burner. The velocity of the drying air was 3,000 ft./min. and a 460° F. temperature in the drying air was achieved. 100% of the air needed for purposes of combustion was premixed with the gas before being fed to the burner. The flame produced in the burner was narrow and shielded form the drying air by the mixing plates or baffles on the Type "AL-5" burner. The nitrogen dioxide output was measured at 1.31.

EXAMPLE 11

To illustrate the reduction in combustion product residue levels in the dried food material itself, a protein isolate was prepared by extracting 200 lbs. of soybean flakes with an alkaline solution of Calcium hydroxide to provide an alkaline extract of protein material. The protein extract was clarified and the protein precipiated with phosphoric acid at a pH of 4.5. The precipitated protein isolate having the noted pH of 7.0 – 7.1. The neutralized slurry was then cooked in a jet cooker at 310° F., with 8 seconds retention time, and at 22 inches of Mercury in the vacuumizer, followed by drying on a spray dryer equped with a 2 ft. section of an "AL-5" Burner of the same general type disclosed in Example 1.

A portion of the neutralized slurry was dried pursuant to the conditions set forth in the present invention wherein the spray dryer provided a total air volume of 1,398 cubic ft./min. and the burner was operated at firing rate of 620 cubic ft./hr. to provide a heat output of 310,000 BTU/hr./lineal ft. of burner. The velocity of the drying air, as measured at the outer edge of the baffles or mixing plates of the burner, was 2,500 ft./min. The spray dryer was operated at an inlet air temperature of 480° F. and an exhaust temperature of 220° F. The feed pressure of the slurry into the spray dryer at a pH of 7.1 and solids level of 9.85% was 1,200 psi.

The burner itself was operated with a fuel mixture containing a stoichiometric portion of air for combustion which was premixed with the gas before being fed to the burner. The flame produced was shielded from the drying air by the mixing plates of the "AL-5" burner. The measured nitrogen dioxide content in the drying air was 0.52 p.p.m. The spray dried soy protein isolate had a moisture content of 5.1% and a measured nitrite content of 6.4 p.p.m.

A second portion of the neutralized slurry was dried with the identical equipment prescribed above wherein the burner was operated under conditions generally specified by the prior art.

The spray dryer provided a total air volume of 1,342 cubic ft./min. and the burner was operated at a firing rate of 594 cubic ft./hr. to provide a heat output of 297,000 BTU/hr./lineal ft. of burner. The velocity of the drying air, as measured at the outer edge of the baffles or mixing plates of the burner, was 2,300 ft./min. The spray dryer was operated at an inlet air temperature of 480° F. and an exhaust temperature of 220° F. The feed pressure of the slurry into the spray dryer at a pH of 7.1 and a solids level of 10.1% was 1,200 psi.

The burner itself was operated with a fuel mixture which was premixed with the gas before being fed to the burner. The flame produced completely filled the trough created by the mixing plates or baffles and extracted a significant portion of the drying air for combustion purposes. The measured nitrogen dioxide content in the drying air was 0.90 p.p.m. The spray dried soy protein isolate had a moisture content of 5.1% and a measured nitrite content of 66 p.p.m.

The above Examples are merely illustrative of the instant invention and it will be understood that various other changes in the details, equipment or steps which have been described may be made without departing from the spirit of the instant disclosure and such changes or modifications are intended to be included within the scope of the instant disclosure.

We claim:

1. In a process for the air drying of a food material, wherein drying air is heated by direct contact with a burner and thereafter a food material is contacted with said drying air, the improvement comprising reducing levels of burner combustion products in said food material by the steps of;
   a. forming a combustible fuel mixture by mixing a combustible fuel with a stoichiometric quantity of air to provide for substantially complete combustion of said fuel;
   b. feeding said mixture to a burner in an amount effective to provide a burner output which does not exceed 800,000 BTU/hr. lineal ft. of burner and combusting said mixture to provide a drying air temperature of at least about 330° F., said drying air having a velocity of at least about 2,000 ft./min. and
   c. shielding the flame formed by combustion of said mixture from said drying air such that aeration of said flame by said drying air for purposes of combustion is substantially reduced.

2. A process as set forth in claim 1 wherein the burner output is between about 300,000 BTU/hr./lineal ft. and 800,000 BTU/hr./lineal ft.

3. A process as set forth in claim 2 wherein the burner output is about 600,000 BTU/hr./lineal ft.

4. In a process for the air drying of a food material, wherein drying air is heated by direct contact with a burner and thereafter a food material is contacted with said drying air, the improvement comprising reducing levels of burner combustion products in said food material by the steps of;
  a. forming a combustible fuel mixture by mixing a combustible fuel with at least about 80% of the air needed for complete combustion of said fuel;
  b. feeding said mixture to a burner in an amount effective to provide a burner output between about 300,000 and 800,000 BTU/hr./lineal ft. of burner, and combusting said mixture to provide a temperature rise in said drying air that is sufficient for drying of said food material, said drying air having a velocity of at least about 2,000 ft./min.; and
  c. shielding the flame formed by combustion of said mixture from said drying air such that aeration of said flame by said drying air for purposes of combustion is substantially reduced.

5. A process as set forth in claim 4 wherein the burner output is about 600,000 BTU/hr./lineal ft.

6. A process as set forth in claim 4 wherein said drying air has a velocity between about 2,000 and 5,000 ft./min.

7. In a process for the air drying of a food material, wherein drying air is heated by direct contact with a burner and thereafter a food material is contacted with said drying air, the improvement comprising reducing levels of burner combustion products in said food material by the steps of;
  a. forming a combustible fuel mixture by mixing a combustible fuel with a stoichiometric quantity of air to provide for substantially complete combustion of said fuel;
  b. feeding said mixture to a burner in an amount effective to provide a burner output between about 300,000 and 800,000 BTU/hr./lineal ft. of burner, said drying air having a velocity of at least about 2,000 ft./min. combusting said mixture; and
  c. shielding the flame formed by combustion of said mixture from said drying air such that aeration of said flame by said drying air for purposes of combustion is substantially reduced.

8. A process as set forth in claim 7 wherein the burner output is about 600,000 BTU/hr./lineal ft.

9. A process as set forth in claim 7 wherein said drying air has a velocity between about 2,000 and 5,000 ft./min.

* * * * *

UNITED STATES PATENT OFFICE
CERTIFICATE OF CORRECTION

Patent No. 4,075,358      Dated February 21, 1978

Inventor(s) Ronald L. Madl et al

It is certified that error appears in the above-identified patent and that said Letters Patent are hereby corrected as shown below:

Column 1, line 52
"varied" should read "carried"

Column 2, line 32
"dissociate" should read "disassociate"

Column 3, line 21
"at" should read "as"

Column 4, line 5
"of" should read "or"

Column 4, line 25
"mantain" should read "maintain"

Column 5, line 41
"when" should read "while"

Column 9, line 47,
"precipiated" should read -- precipitated --.

Signed and Sealed this

Eighteenth Day of July 1978

[SEAL]

Attest:

RUTH C. MASON
Attesting Officer

DONALD W. BANNER
Commissioner of Patents and Trademarks